United States Patent [19]
Bhargava et al.

[11] Patent Number: 4,959,089
[45] Date of Patent: Sep. 25, 1990

[54] PROCESS FOR PREPARING A BARIUM TITANATE FILM

[75] Inventors: Atit Bhargava; Robert L. Snyder, both of Alfred, N.Y.

[73] Assignee: Alfred University, Alfred, N.Y.

[21] Appl. No.: 189,797

[22] Filed: May 3, 1988

[51] Int. Cl.$^5$ ............................................. C03C 10/02
[52] U.S. Cl. ........................................ 65/33; 501/10; 501/21; 501/49; 501/137; 501/139; 427/126.2; 427/126.3; 427/376.2
[58] Field of Search ............... 427/126.2, 126.3, 376.2; 501/10, 21, 49, 137, 139; 65/33

[56] References Cited

U.S. PATENT DOCUMENTS

| | | | |
|---|---|---|---|
| 3,000,745 | 9/1961 | Cianchi | 501/10 |
| 3,195,030 | 7/1965 | Herczog et al. | 501/137 X |
| 3,615,757 | 10/1971 | Herczog et al. | 501/135 X |
| 3,649,353 | 3/1972 | Ulrich | 501/18 X |
| 4,610,971 | 9/1986 | Wada et al. | 501/137 |

OTHER PUBLICATIONS

"An Experimental Study of Barium-Titanate Glass--Ceramics in a Ternary Borate Glass System", Atit Bhargava, Doctoral Thesis submitted to Alfred University, published on or about Mar. 1988.

"Crystallization of Glasses in the System $BaO-TiO_2-B_2O_3$", A. Bhargava et al., Journal of Non-Crystalline Solids, vol. 102, pp. 136–142 (Elsevier Science Publishers, N. Holland, Amsterdam, 1988).

*Primary Examiner*—Karl Group
*Attorney, Agent, or Firm*—Howard J. Greenwald

[57] ABSTRACT

A process for preparing a tetragonal barium titanate film with a thickness of from about 0.1 to about 1.5 millimeters is disclosed.

In the first step of this process, a mixture of a barium compound, a titanium compound, and a boron oxide glass former is provided in a specified ratio.

The reaction mixture is melted at a temperature of 1300–1400 degrees centigrade and then rapidly quenched in form glass. The glass is then place upon a polycrystalline isostructural substrate, and the glass-/substrate assembly is then remelted and, thereafter, subjected to a temperature of from 950 to 1,050 degrees centigrade for from about 25 to about 60 minutes.

20 Claims, No Drawings

4,959,089

PROCESS FOR PREPARING A BARIUM TITANATE FILM

FIELD OF THE INVENTION

A process for the preparation of a tetragonal barium titanate film in which a specified mixture of a barium compound, a titanium compound, and a boron oxide glass forming compound are melted and rapidly quenched to form a glass, the glass is then placed upon a polycrystalline isostructural substrate, and the substrate/glass assembly is then remelted and subjected to a specified heat treatment.

The process of this invention can be utilized to prepare a unique barium titanate glass-ceramic film with a thickness of from about 0.1 millimeter to about 1.5 millimeter.

BACKGROUND OF THE INVENTION

As is known to those skilled in the art, tetragonal barium titanate is useful for the production of capacitors, dielectrics, piezoelectrics, positive temperature coefficient resistance devices(PTCR's), sensors, and the like.

For the aforementioned uses, tetragonal barium titanate should ideally be substantially pore free with substantially zero percent open porosity; a higher porosity barium titanate will generally have high energy losses and degradation of its desired properties. Furthermore, the barium titanate should also have a uniform microstructure with a controlled grain size on the order of from about 0.5 to 1.5 microns micron; barium titanate with a substantially different grain size will have substantially poorer properties.

To the best of applicant's knowledge, a process for the production of tetragonal barium titanate glass-ceramic film containing barium titanate as the only crystalline material with a uniform microstructure on an isostructural substrate has not been provided by the prior art.

It is an object of this invention to provide a process for the preparation of tetragonal barium titanate with a uniform microstructure of from about 0.5 to about 1.5 microns in a controllable, reproducible manner.

SUMMARY OF THE INVENTION

In accordance with this invention, there is provided a process for preparing a tetragonal barium titanate film with a thickness of from about 0.1 millimeter to about 1.5 millimeter, comprising the steps of sequentially: (a)providing a batch of from about 46 to about 54 mole percent of a barium compound, from about 18 to about 32 mole percent of a titanium compound, and from about 32 to about 18 mole percent of a a boron oxide glass former, wherein each of said reagents is calculated on the oxide basis in mole percent; (b)melting said batch at a temperature of from about 1300 to about 1400 degrees centigrade for from about 25 to about 40 minutes until it is molten; (c)reducing the temperature of the molten batch from the temperature of the melt to ambient temperature in a period of less than about 30 seconds, thereby producing glass; (d)placing the glass upon a polycrystalline isostructural substrate, thereby producing a substrate/glass assembly; (e)subjecting the substrate/glass assembly to a temperature of from about 1150 to about 1250 degrees centigrade for from about 10 to 30 minutes until the glass becomes molten and flows over the surface of the substrate; (f)reducing the temperature of the assembly to from about 950 to about 1,050 degrees centigrade; and (g)maintaining the temperature of the assembly at a temperature of from about 950 to about 1,050 degrees centigrade for from about 25 to about 60 minutes.

DESCRIPTION OF THE PREFERRED EMBODIMENTS.

The process of this invention allows one to produce a barium titanate with desired microstructure in a controllable, reproducible manner. In general, the process involves the steps of sequentially (1)providing a barium compound, a titanium compound, and a boron oxide glass former, (2)mixing said materials, (3)melting the batch, (4)rapidly quenching the melt, (5)transferring the cooled melt(glass) to an isostructural substrate, (6)reheating the substrate/glass assembly to the melting temperature of the glass, and (7)cooling to allow crystallization of the melt.

The process of this invention produces tetragonal barium titanate. As is known to those skilled in the art, the term tetragonal refers to a system of crystallization having all three axes at right angles and the two lateral angles equal. Thus, with tetragonal barium titanate, the crystals have a form in which there are three mutually perpendicular axes, two of which are of equal length.

In the first step of the process, a mixture of a barium compound, a titanium compound, and a boron oxide glass former is provided.

Any barium compound which, after having been subjected to a melting temperature of from about 1100 to 1350 degrees centigrade, does not leave a residue of ions in the melt, can be used in the process. As used in this specification, the term "ions" includes any electrically charged atom, radical, or molecule, but it specifically excludes oxygen ions, barium ions, titanium ions, and boron ions.

Thus, by way of illustration, barium oxide can be used in this process. Although barium and oxygen ions may be left in the melt, they are not "ions" within the meaning of this term as used in this case.

Thus, by way of illustration, barium carbonate can be used. The carbonate portion of the molecule will form carbon dioxide and will leave the melt. The barium ions left in the melt are not ions within the meaning of this specification.

Thus, for example, barium nitrate may be used; in this case, the nitrate portion of the molecule forms gaseous oxides of nitrogen which leave the melt.

Thus, barium oxalate can be used; the oxalate portion of the compound forms gaseous oxides of carbon.

Other barium compounds which can be used include barium hydroxide, barium peroxide, barium perhydrateoxide, barium acetate, and the like.

The preferred barium compounds are selected from the group consisting of barium oxide and barium carbonate. The most preferred barium compound is barium carbonate.

It is preferred that the barium compound used in the process of this invention contain less than about 1.0 percent, by weight of barium compound, of impurity. It is preferred that the barium compound contain less than 0.75 percent, by weight, of impurity. In the most preferred embodiment, the barium compound contains less than 0.7 percent, by weight, of impurity. Thus, for example, in one embodiment, Fisher Certified Grade barium carbonate purchased from the Fisher Scientific Company of New Jersey was used. As used in this specification, the term Fisher Certified Grade refers to a reagent which meets or surpasses the most recent American Chemical Society Standard for purity.

It is preferred that the barium compound have a particle size such that 100 percent of its particles are smaller than 10 microns.

The barium compound used in the process of this invention is mixed with a titanium compound selected from the group consisting of titanium dioxide, titanium monoxide, titanium sesquioxide, titanium oxalate, and mixtures thereof. The preferred titanium compound is titanium dioxide. The titanium compound preferably is reagent grade, with an impurity level less than about 0.1 percent by weight. It is preferred that the titania contain less than about 0.05 weight percent of impurity. It is most preferred that the titania contain less than about 0.02 weight percent of impurity.

The titanium compound used in this process preferably has a particle size distribution such that 100 percent of its particles are finer than 10 microns.

The barium compound and the titanium compound are mixed with a boron oxide glass former. As those skilled in the art are aware, suitable boron oxide glass formers include boron oxide, boric acid, metaboric acid, tetraboric acid, mixtures thereof, and the like.

The boron oxide glass former should preferably contain less than about 0.1 weight percent of impurity and, more preferably, less than about 0.05 weight percent of impurity. In the most preferred embodiment, the glass former is reagent grade material which contains less than about 0.03 weight percent of impurity and has all of its particles smaller than about 10 microns.

The preferred boron oxide glass former is boric acid.

Suitable amounts of the barium compound, the titanium compound, and the boron oxide glass former are mixed so that the mixture is comprised of from about 46 to about 54 percent, by total mole percent of the mixture, of barium compound, calculated on the oxide basis in cationic mol percent. As those skilled in the art are aware, one can calculate how many moles of barium oxide will be produced by a specified weight of barium compound at decomposition of the respective barium compound. Thus, for example, barium carbonate decomposes to barium oxide and carbon dioxide at a temperature of about 1,450 degrees centigrade, and each gram of barium carbonate yields about 0.78 grams of barium oxide; 153.33 grams of barium oxide are equal to one gram mole of barium oxide. The titanium compound and the boron oxide glass forming compound are also converted to the respective molar ratios of titanium oxide and boron oxide, and then the molar ratio of the barium oxide to the total moles of the all the oxides is calculated. Sufficient barium compound is used so that the barium oxide yield of the barium compound is from about 48 to about 52 mole percent. In one preferred embodiment, sufficient barium compound is used so that the barium oxide yield is about 50 mole percent.

In addition to the barium compound, the mixture is also comprised of from about 18 to 32 mole percent of titanium oxide, also calculated from the titanium compound used. It is preferred that the mixture be comprised of 22 to 28 mole percent of the titanium compound, on oxide basis. In one embodiment, the mixture is comprised of about 25 mole percent of the titanium compound, on oxide basis.

The mixture is also comprised of from about 18 to about 32 mole percent of the boron oxide glass former, provided that the total sum of the oxide yields of the barium oxide, titanium oxide, and boron oxide equals 100, in mole percent. It is preferred that from about 22 to about 28 mole percent of the boron oxide glass former be used, calculated on the basis of oxide mole percent.

Table 1 illustrates various mixtures which can be used in the process of this invention.

TABLE 1

| Composition | Mole Percent Barium Oxide | Mole Percent Titanium Dioxide | Mole Percent Boron Oxide |
| --- | --- | --- | --- |
| 1 | 50 | 20 | 30 |
| 2 | 50 | 25 | 25 |
| 3 | 50 | 30 | 20 |
| 4 | 48 | 25 | 27 |
| 5 | 48 | 27 | 25 |
| 6 | 50 | 18 | 32 |
| 7 | 50 | 22 | 28 |

Once suitable amounts of the barium compound, the titanium compound, and the boron oxide glass former have been weighed out, they are intimately mixed. These raw materials may be mixed by means well known to those skilled in the art. Thus, for example, the mixing processes disclosed on pages 21-30 to 21-38 of Perry and Chilton's "Chemical Engineers' Handbook," Fifth Edition (McGraw-Hill Book Company, New York, 1973), the disclosure of which is hereby incorporated by reference into this specification, may be used.

If necessary, the mixture of reagents is ground by conventional communition means so that all of the particles in the mixture are smaller than about 10 microns.

The mixture thus provided in the first step of this process, often referred to as the "batch," is then melted at a temperature of from about 1300 to about 1400 degrees centigrade for from about 25 to about 40 minutes. It is preferred to melt the batch at a temperature of from about 1350 to about 1375 degrees centigrade for from about 25 to about 35 minutes. In one preferred embodiment, the batch is melted for about 30 minutes at a temperature of about 1,370 degrees centigrade.

The batch may be melted by means well known to those skilled in the art. Thus, for example, one may melt the batch in a platinum crucible, a platinum-gold crucible, and the like. Thus, one can use conventional glass melting refractory blocks to conduct the melting on a large scale involving tons of material. Other means of melting the batch will be apparent to those skilled n the art.

The melting of the batch is continued until the batch is molten. One can determine when the batch is molten by visual means, by viscosity measurements, and by other means well known to those skilled in the art.

Once the batch has melted, it is rapidly quenched by conventional means well known to those skilled in the art, thereby producing a glass. The quenching cools the melt suddenly so that its temperature is preferably reduced to ambient in about less than about 30 seconds and, more preferably, in less than about 15 seconds.

The quenching may be conducted by means well known to those in the art. Thus, by way of illustration and not limitation, one can use the techniques disclosed by Andrew Herczog in his paper entitled "Microcrystalline $BaTiO_3$ by Crystallization from Glass," Journal of the American Ceramic Society, Vol. 47, No. 3, pages 107-115 (Mar. 21, 1964), the disclosure of which is hereby incorporated by reference into this specification. By way of illustration, one can pour the melt onto a plate of aluminum and roll it with an aluminum roller. Other suitable means of quenching will be apparent to those in the art.

In one embodiment, the melt is rapidly quenched by fritting. As those skilled in the art are aware, the melt may be fritted by allowing the stream of molten glass to fall into water. Alternatively, one can expose the stream of molten glass to a blast of air and water, or pass the stream between water-cooled rolls. Suitable methods of fritting are disclosed in A. E. Dodd's "Dictionary of Cermaics..,".(Philosophical Library, Inc., New York, 1964), the disclosure of which is hereby incorporated by reference into this specification.

The quenching of the melted batch produces pieces or strips of glass which generally are from about 1 to about 2 millimeters of uniform thickness. These pieces or strips of glass are placed onto an isostructural substrate. Alternatively, the strips or pieces of glass can be ground into a fine powder, and the powder then be transferred to the isostructural substrate.

In one embodiment, the melt is quenched by fritting, thereby producing a frit which can be easily converted to a fine powder, and the fine powder thus produced is then transferred to a polycrystalline isostructural substrate for further processing. In general, the fine powder should have all of its particles smaller than about 10 microns.

The term polycrystalline, as used in this specification, refers to a material which is composed of many crystals, which is an aggregate, as distinct from a single crystal.

The term "isostructural," as used in this specification, refers to a material with the perovskite crystal structure. This perovskite crystal structure is described on page 67 of W. D. Kingery et al.'s "Introduction to Ceramics," Second Edition (John Wiley and Sons, New York, 1976), the disclosure of which is hereby incorporated by reference into this specification. As those skilled in the art are aware, some materials which exhibit the perovskite crystal include barium titanate, barium niobate, barium tantalate, strontium titanate, strontium niobate, strontim tantalate, lead titanate, calcium titanate, mixtures thereof, and the like.

The preferred isostructural substrate is barium titanate, for it is the closest in structure to the barium titanate being produced by the process of this invention. This substrate is a solid material which is formed by sintering by conventional means.

The polycrystalline barium titanate substrate may be produced by conventional means well known to those skilled in the art. Thus, for example, one can used solid state reaction synthesis, co-precipitation, sol-gel synthesis, and the like.

The glass material produced by the rapid quenching is placed upon the polycrystalline isostructural substrate. If the glass material is in powder form, it is spread evenly over the substrate. If it is solid form, it is placed substantially evenly on the substrate. In either case, the substrate should be of large enough dimensions so that the glass material is within the boundaries of the substrate's surface and the film which forms upon the melting of the glass does not run outside the boundaries of the substrate.

After the glass material is placed upon the substrate, it is subjected to a specified heat treatment in which it is first remelted for a specified period of time, and then subjected to a certain temperature for a specified period of time.

The glass material on the substrate is generally remelted at a temperature of from about 1150 to about 1250 degrees centigrade for from about 10 to 30 minutes until it molten and flows on the surface of the substrate. It is preferred to remelt the glass at a temperature of from 1175 to about 1225 degrees centigrade for from about 15 to about 20 minutes. In one embodiment, the glass is remelted at a temperature of about 1,200 degrees centigrade for about 15 minutes.

The remelting may be accomplished by means well known to those skilled in the art. Thus, for example, the substrate/glass assembly can be introduced into a furnace at the specified temperature.

Once the glass has been remelted and is molten, it is then cooled to a temperature of from 950 to about 1,050 degrees centigrade. It is preferred to cool it to a temperature of from about 975 to about 1,025 degrees centigrade. In one embodiment, it is cooled to a temperature of about 1,000 degrees centigrade.

The glass can be cooled by means well known to those in the art. Thus, for example, one can reduce the set point of the furnace in which the substrate/glass assembly is being held.

Once the substrate/glass assembly has been cooled to the specified temperature, it is then maintained at that temperature for a specified period. Thus, the assembly is maintained at a temperature of from about 950 to about 1050 degrees centigrade for from about 25 to about 60 minutes. It is preferred to maintain the assembly at a temperature of from about 975 to about 1,025 degrees centigrade for from about 30 to about 40 minutes. In the most preferred embodiment, the assembly is maintained at a temperature of about 1,000 degrees centigrade for about 30 minutes.

Thereafter, the assembly is allowed to cool and it is then processed for further use.

In another embodiment of this invention, a barium titanate film is produced by a process in which the intermediate rapid quenching and remelting steps are omitted. In this embodiment, the same barium compound/titanium compound/boron oxide glass former compound mixture is provided. Thereafter, this batch is also melted at a temperature of from about 1300 to about 1400 degrees centigrade for from about about 25 to about 40 minutes; this melting occurs on the polycrystalline isostructural substrate defined above directly, without any intermediate melting or rapid quenching steps. Alternatively, the batch can be melted on a crucible and then poured onto the isostructural substrate. Thereafter, the melted material and the substrate are maintained at a temperature of from about 950 to about 1050 degrees centigrade for from about 25 to about 60 minutes.

In another embodiment of this invention, the aforementioned mixture of barium compound/titanium compound/boron oxide compound is provided, the mixture is melted at a temperature of from about 1300 to about 1400 degrees centigrade for from about 25 to about 40 minutes, and a rod or tube made of isostructural material is inserted into the melt and used to draw fibers or rods from the melt. Alternatively, fibers can be extruded through dies comprised of isostructural material.

In yet another embodiment of this invention, the barium compound/titanium compound/boron oxide glass former compound mixture described above is provided, melted, and rapidly quenched as described above to produce the glass. Thereafter, the glass is heat treated in a conventional heat treatment schedule without the isostructural substrate. Via such a process, barium titanate glass ceramics can be produced at a temperature of 850 degrees centigrade. However, the product produced is mixed and contains both barium titanate and barium borate. The product, however, does have all the advantage of a conventional glass ceramic.

In yet another embodiment of this invention, the process is modified to produce superconducting glass ceramic materials. In this embodiment, a mixture of oxides in provided in a specified mole ratio to yield a required stoichiometry. Thereafter, this mixture is melted, rapidly quenched to yield a glass, remelted on an isostructural substrate, and cooled to crystallize the phase(s) known to superconduct in substantially the same manner as that described above.

The following examples are presented to illustrate the claimed invention but are not to be deemed limitative thereof. Unless otherwise specified, all parts are by weight and all temperatures are in degrees centrigrade.

EXAMPLES

Example 1

8.7354 grams of Fisher Certified Grade barium carbonate (lot number 775836, available from the Fisher Scientific Company of New Jersey), 1.7719 grams of Fisher Certified Grade titanium dioxide (lot number 792740, available from Fisher Scientific Company) and 2.8009 grams of reagent grade boric acid (lot number 733530, available from Fisher Scientific) were charged into a mortar and thoroughly mixed with a pestle for about 30 minutes. This batch was then transferred to a Spec Mixer vibratory mill (Catalog number 8000, manufactured by Spec Industries, Inc. of Scotch Plains, N.J.) and mixed for 30 minutes.

The mixed batch was then transferred to a platinum crucible. The crucible containing this batch was then inserted into a melting furnace (type 51333, serial number 858019, manufactured by the Lindberg Company of Watertown, Wis.). The batch was heated to a temperature of 1370 degrees centigrade in the furnace and maintained at this temperature in the furnace for 30 minutes, at which time it was molten.

The crucible containing the molten glass was lifted out of the furnace, and the melt was poured onto an aluminum plate which had a surface of about one square foot. The poured melt was simultaneously rolled with an aluminum roller with a diameter of about 2.0 inches and a length of about 6.0 inches in order to cool it. Glass fragments were formed about 1 millimeter thick and about 1.0 inch long.

An isostructural substrate of barium titanate was prepared by solid state synthesis. 20 grams of reagent grade barium titanate (code 219-9, lot number MI-676, available from Transelco Division, Ferro Corporation, Pen Yam, N.Y.) were dry pressed into a disc about 1 centimeter in diameter and about 2 millimeters thick, using a steel die. The dry pressing was done on a Carver Laboratory Press, ( Model M, Unit Serial Number 23505-414, made by Fred S. Carver, Inc. of Menomanee Falls, Wis.); A pressure of 5,000 pounds was applied for 30 seconds; no binder was used. The pressed disc was then sintered at a temperature of 1370 degrees centigrade for two hours in a high temperature furnace (type 46100, model number F46128C, serial number 46100130, manufactured by the Thermodyne Corporation of Debuque, Iowa), thereby forming the substrate.

The glass pieces were evenly distributed over the surface of the barium titanate substrate. The substrate/-glass assembly thus produced was then placed back into the Thermodyne high temperature furnace which was at a temperature of 1200 degrees centigrade, and it was maintained at this temperature for 15 minutes. Thereafter, the furnace set point was reduced to 1,000 degrees centigrade. After the furance reached the 1,000 degree temperature, it was maintained at this temperature for 60 minutes. Then the furnace was shut off and allowed to cool.

The barium titanate glass ceramic produced was evaluated by Powder X-Ray Diffraction on a Siemens D-500 Diffractometer (model number C72298-A223-B-9- POZ-288, manufactured by Siemens Company of West Germany) using copper K-alpha radiation and a diffracted beam graphite monocrometer. The results of this experiment are shown in Table 2. As can be seen from this data, the only crystalline phase in the sample is tetragonal barium titanate.

TABLE 2

| d-observed (Å) | d-calculated (Å) | Rel. Int. | hkl |
|---|---|---|---|
| 4.0278 | 4.0304 | 6 | 001 |
| 3.9982 | 3.9934 | 11 | 100 |
| 2.8382 | 2.8368 | 100 | 101 |
| 2.3135 | 2.3127 | 24 | 111 |
| 2.0516 | 2.0152 | 10 | 002 |
| 1.9971 | 1.9967 | 19 | 200 |
| 1.7873 | 1.7873 | 7 | 210 |
| 1.6329 | 1.6328 | 21 | 211 |
| 1.4185 | 1.4184 | 5 | 202 |
| 1.4124 | 1.4119 | 8 | 220 |
| 1.2731 | 1.2734 | 2 | 103 |
| 1.2627 | 1.2628 | 4 | 310 |
| 1.2046 | 1.2051 | 2 | 311 |
| 1.1563 | 1.1563 | 2 | 222 |
| 1.1083 | 1.1076 | 3 | 320 |
| 1.0783 | 1.1083 | 3 | 213 |
| 1.0699 | 1.0701 | 4 | 312 |
| 1.0677 | 1.0677 | 4 | 321 |
| 1.9710 | 0.9706 | 3 | 322 |
| 0.9686 | 0.9686 | 2 | 410 |

A sample of the barium titanate film also was subjected to differential scanning calorimetry on a 910 Differential Scanning Calorimeter using a 9900 Computer/Thermal Analyzer (model number 910001-908, serial number 1650, manufactured by E. I. DuPont de Nemours & Company, Wilmington, Del.). The sample showed a Curie temperature of about 124 degrees centigrade. The ferro to para transition was clearly visible.

Another sample of the barium titnate film was observed under a secondary mode of an scanning electron miscroscope (type Autoscan, serial number 52, manufactured by the ETEC Corporation of Hayward, Calif.). A fine grained microstructure with a very narrow grain size distribution was observed.

Example 2

2 729 grams of barium oxide (stock number 0810, purchased from Apache Chemicals of Seward, Ill.), 1.549 grams of copper oxide (Fisher Certified Grade, lot 870578, purchased from Fisher Scientific of New Jersey), 0.4350 grams of yttrium oxide (lot number Y-0-4-256, purchased from Research Chemicals of Phoenix, Ariz.), and 5.536 grams of boron oxide were charged into a mortar and thoroughly mixed for about 30 minutes. The batch was then transferred to a Spex Vibratory Mill (Catalog number 8000) and mixed for 30 minutes. The mixed batch was transferred to a slip cast silica crucible (type 138506, lot number 4-81-542, available from the Fireline Co., Ohio).

The crucible containing the batch was inserted into a Fast Melt melting furnace (Serial number 6618-0287, available from Keith Company, Inc. of Pico Rivera, Calif.). The batch was heated to a temperature of 1300 degrees centigrade and held at this temperature for 25 minutes, at which time it was molten. The crucible containing the molten batch was then taken out of the furnace, and the melt was poured onto an aluminum plate and roller quenched in accordance with the procedure of Example 1 to form glass fragments about 1 millimeter thick.

Some of these glass fragments were transferred to a mortar and pestle and ground until they were fine, with a particle size less than about 50 microns.

4.779 grams grams of barium oxide, 1.715 grams of yttrium oxide, and 3.662 grams of copper oxide were weighed and and mixed by the mortar and pestle/Spex Vibratory Mill procedure described above to form a second batch. 1.085 grams of the fine powder with particle size less than 50 microns was mixed with 4.340 grams of the mixed oxides from this second batch in substantial accordance with the procedure described above, and this mixture was melted at 1,300 degrees centigrade for 20 minutes in the Fast Melt furnace. This glass mixture was then poured out and rapidly quenched in accorce with the procedure described above to form glass pieces about 1 millimeter thick.

The glass pieces were transferred onto a platinum trauy and heat treated at 800 to 950 degrees centigrade in the Thermotyne furnace. X-Ray Diffraction analysis was then conducted on the product obtained in accordance with the procedure of example 1. The product contained crystalline phases.

In one embodiment of this invention, a mixture of reagents is used to prepare ceramic materials containing $Ba_2YCu_3O_{7-x}$, a compound known to superconduct at or about the temperature of liquid nitrogen. In this embodiment, illustrated in Example 2, a mixture of oxides is provided is a specified composition ratio to yield a specified stoichiometry. Thereafter, this mixture is melted for about 30 minutes at a temperature of from about 1250 to about 1300 degrees centigrade, and it is thereafter rapidly quenched to yield a glass in accordance with the procedure described in other portions of this specification. The glass strips are then heat-treated to yield crystalline phases, one of which is the aforementioned 3/2/1 copper/barium/yttrium composition.

Suitable amounts of any of the barium compounds listed in other portions of this specification may be used. The yttrium compound may be yttrium oxide, yttrium nitrate, yttrium oxalate, yttrium carbonate, yttrium hydroxide, and the like. The copper compound may be copper acetate, copper carbonate, cooper oxalate, copper oxide, and the like.

After amounts suitable to obtain the correct stoichiometry of the copper compound, the yttrium compound, and the barium compound have been mixed, a glass former (called "base glass") is added. The glass former may be boron oxide or boric acid; if boric acid is used, it is normalized to yield boron oxide. The weight ratio of the glass former to the mixed oxide mixture is (u from about ½ to about 7/1.

The mixture of the glass former/mixed oxides is mixed. Thereafter, in substantial accordance with the procedure of Example 1, this mixture is melted at a temperature of from about 1250 to about 1400 degrees centigrade for from about 20 to about 40 minutes and then rapidly quenched to yield strips of glass. The glass strips are then heat treated at temperatures of from about 750 to about 980 degrees centigrade to yield crystalline phases comprised of the 2/1/3 barium/yttrium/copper composition.

In another embodiment, the glass-ceramic may be heated for from about 5 to about 20 hours to volatilize a large portion of the glass, leaving crystals of the crystalline phases on a substrate.

In another embodiment, the final glass may be transferred to an isostructural substrate and further heat treatment may be conducted in accordance with the procedure described above. This process results in an enrichment of the $Ba_2YCu_3O_{2-x}$ compound in the glass ceramic.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

What is claimed is:

1. A process for preparing a tetragonal barium titanate film with a thickness of from about 0.1 millimeter to about 1.5 millimeters, comprising the steps of sequentially:
   (a) providing a batch comprising from about 46 to about 54 mole percent of a barium compound, from about 18 to about 32 mole percent of a titanium compound, and from about 32 to about 18 mole percent of a boron compound, wherein each of said compounds is calculated on the oxide basis in mole percent and wherein:
      1. said barium compound is selected from the group consisting of barium oxide, barium carbonate, barium nitrate, barium oxalate, barium hydroxide, barium peroxide, barium perhydrateoxide, barium acetate, and mixtures thereof;
      2. said titanium compound is selected from the group consisting of titanium dioxide, titanium monoxide, titanium sesquioxide, titanium oxalate, and mixtures thereof;
      3. said boron compound is selected from the group consisting of boron oxide, boric acid, metaboric acid, tetraboric acid, and mixtures thereof;
      4. said titanium compound, and said boron compound contains less than about 0.1 percent by weight, of impurities, and said barium compound contains less than 1.0 percent, by weight, of impurities;
   (b) melting said batch at a temperature of from about 1300 to about 1400 degrees centigrade for from about 25 to about 40 minutes until it is molten;
   (c) reducing the temperature of the molten batch from the temperature of the melt to ambient temperature in a period of less than about 30 seconds, thereby producing glass;
   (d) placing the glass upon a surface of a polycrystalline isostructural substrate, thereby producing a substrate/glass assembly;
   (e) subjecting the substrate/glass assembly to a temperature of from about 1150 to about 1250 degrees centigrade for from about 10 to 30 minutes until the glass becomes molten and flows over the surface of the substrate;
   (f) reducing the temperature of the assembly to from about 950 to about 1,050 degrees centigrade; and (g) maintaining the temperature of the assembly at from about 950 to about 1,050 degrees centigrade for from about 25 to about 60 minutes.

2. The process as recited in claim 1, wherein said barium compound is selected from the group consisting of barium oxide and barium carbonate.

3. The process as recited in claim 2, wherein said titanium compound is titanium dioxide.

4. The process as recited in claim 3, wherein said boron compound is boric acid.

5. The process as recited in claim 4, wherein said barium compound is barium oxide.

6. The process as recited in claim 5, wherein, prior to the time it is melted, the batch of barium oxide, titanium dioxide, and boron oxide is comprised of particles 100 percent of which are smaller than 10 microns in diameter.

7. The process as recited in claim 6, wherein said batch of barium oxide, titanium dioxide, and boron oxide is melted at a temperature of from about 1350 to about 1375 degrees centigrade for from about 25 to about 35 minutes.

8. The process as recited in claim 7 wherein, after said batch has been melted, the temperature of the molten batch is reduced from the temperature of the melt to ambient temperature in a period of less than about 15 seconds.

9. The process as recited in claim 8, wherein the melt is rapidly quenched by fritting.

10. The process as recited in claim 8, wherein said polycrystalline isostructural substrate is a substrate of barium titanate.

11. The process as recited in claim 10, wherein said barium titanate substrate is prepared by solid state reaction synthesis.

12. The process as recited in claim 10, wherein said barium titanate substrate is prepared by coprecipitation.

13. The process as recited in claim 10, wherein said barium titanate substrate is prepared by sol-gel synthesis.

14. The process as recited in claim 10, wherein said substrate/glass assembly is subjected to a temperature of from about 1175 to about 1225 degrees centigrade for from about 15 to about 20 minutes.

15. The process as recited in claim 14, wherein, after said substrate/glass assembly has been subjected to said temperature of from about 1175 to about 1225 degrees for from about 15 to about 20 minutes, its temperature is reduced to a temperature of from about 975 to about 1,025 degrees centigrade.

16. The process as recited in claim 15, wherein, after the temperature of the assembly has been reduced, it is maintained at said temperature of from about 975 to about 1,025 degrees centigrade for from about 30 to about 40 minutes.

17. The process as recited in claim 16, wherein said barium oxide contains less than about 0.7 weight percent of impurity.

18. The process as recited in claim 17, wherein said titanium dioxide contains less than about 0.02 weight percent of impurity.

19. The process as recited in claim 18, wherein said boric acid contains less than about 0.03 weight percent of impurity.

20. The process as recited in claim 19, wherein said batch is comprised of about 50 mole percent of barium oxide.

* * * * *